US007045034B2

(12) United States Patent
McKillip

(10) Patent No.: US 7,045,034 B2
(45) Date of Patent: May 16, 2006

(54) INTEGRATED FORMS AND METHOD OF MAKING SUCH FORMS

(75) Inventor: John J. McKillip, Rockford, IL (US)

(73) Assignee: Malessa Partners, L.L.C., Rockford, IL (US)

( * ) Notice: Subject to any disclaimer, the term of this patent is extended or adjusted under 35 U.S.C. 154(b) by 111 days.

(21) Appl. No.: 10/817,534

(22) Filed: Apr. 2, 2004

(65) Prior Publication Data

US 2004/0188009 A1 Sep. 30, 2004

Related U.S. Application Data

(63) Continuation-in-part of application No. 10/395,360, filed on Mar. 24, 2003, now Pat. No. 6,989,183, which is a continuation of application No. 09/417,372, filed on Oct. 13, 1999, now Pat. No. 6,656,555.

(51) Int. Cl.
*B32B 38/04* (2006.01)
*B32B 38/14* (2006.01)

(52) U.S. Cl. ...................... 156/277; 156/250; 156/256; 156/257; 156/268; 156/269; 156/270

(58) Field of Classification Search ................ 156/252, 156/253
See application file for complete search history.

(56) References Cited

U.S. PATENT DOCUMENTS 4,664,416 A * 5/1987 Steidinger ...................... 462/2
5,219,183 A * 6/1993 McKillip ..................... 283/62
5,462,488 A * 10/1995 McKillip ..................... 462/26
5,466,013 A * 11/1995 Garrison ...................... 283/107
5,632,842 A * 5/1997 Oliver et al. ............... 156/268
5,707,475 A * 1/1998 Steidinger et al. .......... 156/257
5,736,212 A 4/1998 Fischer
5,782,497 A * 7/1998 Casagrande ................. 283/110
5,782,691 A * 7/1998 Stewart ......................... 462/4
6,190,747 B1 * 2/2001 Fischer ....................... 428/42.2
6,305,717 B1 * 10/2001 Chess .......................... 283/61
6,350,342 B1 * 2/2002 Steidinger et al. .......... 156/257
6,403,191 B1 6/2002 Casagrande (Continued)

FOREIGN PATENT DOCUMENTS

GB 2 323 330 * 9/1998

(Continued)

*Primary Examiner*—Melvin Mayes
(74) *Attorney, Agent, or Firm*—Fitch, Even, Tabin & Flannery

(57) ABSTRACT

A form that incorporates either a label or card such that the form can be reliably printed on by the end user and manufactured less expensively. The integrated label form includes a top printable substrate and a liner substrate mated together by an adhesive. The top printable substrate serves at least partially as removable portions capable of being reapplied. Weakened lines of substrate may be provided to define removable portions on the top printable substrate. The form also may include a similar printable substrate mated to the other side of the liner by adhesive. Weakened lines of substrate also may formed in the second substrate to define removable portions. The integrated card form includes a printable substrate and a first and second laminate mated to the substrate and together by an adhesive. Weakened lines of substrate and first laminate define an integrated removable portion capable of being held in the form by the second laminate and easily removed manually when desired. In the integrated card form and the integrated label form, a recess may be provided adjacent the removable portion to facilitate removal of the removable portion. The integrated forms are easily manufactured by a single piece of equipment.

17 Claims, 8 Drawing Sheets

U.S. PATENT DOCUMENTS 6,656,555 B1 12/2003 McKillip
2002/0000718 A1 * 1/2002 Schwarzbauer et al. ...... 283/62
2003/0067159 A1 * 4/2003 Ritchie et al. .............. 283/101
2003/0186014 A1 10/2003 McKillip
2004/0056476 A1 * 3/2004 Behnen ....................... 283/61
2004/0191457 A1 * 9/2004 McKillip ................... 428/40.1
2004/0191458 A1 9/2004 McKillip
2005/0053744 A1 * 3/2005 Chess ........................ 428/40.1
2005/0147781 A1 * 7/2005 Dronzek et al. ........... 428/40.1
2005/0181167 A1 * 8/2005 Behnen ..................... 428/41.9

FOREIGN PATENT DOCUMENTS

JP 9-277758 * 10/1997

* cited by examiner

INTEGRATED FORMS AND METHOD OF MAKING SUCH FORMS

CROSS REFERENCE TO RELATED APPLICATIONS

This application is a continuation-in-part of patent application Ser. No. 10/395,360, filed Mar. 24, 2003 now U.S Pat. No. 6,989,183, which is a continuation of patent application Ser. No. 09/417,372, filed Oct. 13, 1999, now U.S. Pat. No. 6,656,555.

FIELD OF THE INVENTION

This invention relates generally to printable forms and methods of making such forms and, more particularly, to printable forms with integrated labels and cards.

BACKGROUND OF THE INVENTION

There is a need for improved integrated business forms and methods of manufacturing such forms. Integrated forms consolidate different business objectives or services into a single form. A goal of such forms is not only to offer end users the flexibility to provide a variety of information and information transfer options through a single form, but to also reduce the time, money and material associated with using such business forms for both the end users and the form manufacturers. In the end, truly integrated forms increase the reliability, confidence and convenience in exchanging information between businesses and consumers.

The concept of an integrated form can be employed in numerous varieties depending on the objects of the particular end use. For example, an integrated form may consist of an invoice portion and a label portion incorporated into the same form. Thus, the business can print both the invoice information as well as the address information at the same time.

The mail order industry is a prime example of where such type of label is desired to ensure accurate billing and convenience to the consumer. For instance, in the mail order industry, the mail order company includes with the product an invoice, a shipping card addressed to the consumer and affixed to the packaging and a return card so that the consumer can conveniently return the purchased product within the return period. The obvious shortcoming with this process is the expense, time and possible confusion with purchasing, stocking and printing three separates pieces (i.e., the invoice, the addressee label, and the return address label or card).

An attempt to address these shortcomings is the use of a dedicated section on the invoice for printing of the return address. Thus, the form is sent through a printer which prints both the invoicing information and the return address in one process. In one form, the dedicated section may be outlined by a perforated section for detachment by the consumer. The obvious shortcomings include that the consumer must cut or tear the return address section from the form and affix it to the package with durable tape or adhesive in a manner that does not obstruct the address information. Because consumers do not always have adequate tape or adhesive, they use whatever they have available, which experience has shown, tends not to withstand the stresses associated with commercial shipping. As a result, the return address section is susceptible to falling off, which, when it occurs, often leads to disruption of the mailing system, disputes over whether the package was returned timely and damaged goods.

An attempt to address the return address situation has been made by adding a label to the form. These types of forms are commonly made by mating one side of a liner (such as a silicone coated liner) to the form and having a pressure sensitive label on the other side of the liner. The label then carries the address information, as well as the appropriate adhesive for reliable affixation to a return package. A shortcoming with this type of form is that the thickness created by the stacking of the form, the liner and the label often causes problems during the printing step. That is, the form jams the printer and prevents further use until appropriate service is undertaken. Another shortcoming is associated with pre-dispensing of the label because the label is not truly integrated with the form. That is, the label separates from the form and sticks to the rollers and/or drum of the printer. Thus, there is potential for serious damage to the printer. An even further shortcoming is the requirement additional materials to produce a three layer form, which is only capable of providing a limited number of labels on one side of the form.

Integrated forms also are desired in industries that have the need to distribute cards, such as membership cards for identification or other programs (e.g., frequent buyer programs and insurance programs). The cards traditionally have been printed separately and, to distribute such cards, they have been forwarded to the consumer under a separate forwarding cover letter. To address this situation, some companies attach the card to a form (such as a form forwarding letter) with a releasable adhesive. The obvious shortcoming is that the form is typically pre-printed and then run through a separate machine to add adhesive and the card. As a result, the card does not always become adequately affixed to the form, making it difficult to handle and susceptible to becoming unintentionally detached from the form. In addition, during removal of the card, it tends to peal off the top layer of the form, thereby reducing (and, in most cases eliminating) the backside of the card as a place for printed information.

Moreover, because the card tends to be inadequately secured to the form, it is not practical to consider printing after the card has been affixed. That is, the cards tend to fall off during the printing stage and bind up the printer. As explained above for labels, there is potential for serious damage to the printer. Thus, there is need for truly integrated forms that incorporate labels, cards, etc. into the form.

There also is the need to improve the methods of manufacturing such forms. The typical manufacturing equipment includes a paper infeed unit, a vacuum applicator unit, an unwind unit containing transfer tape, a hot melt applicator head, a feed control unit, an integral die cut unit, a hot melt unit and a fold-to-fold delivery unit. This processing equipment is commonly contained in two separate pieces of equipment. In other words, the manufacturing process is not one straight through in-line process, and therefore, tends to be expensive and labor intensive. The use of multiple machines slows the entire manufacturing process, increases costs and requires additional personnel.

Accordingly, it has been determined that there exist the need for an improved integrated form that is more end user friendly and that facilitates a more economical method of manufacturing.

SUMMARY OF THE INVENTION

In accordance with the invention, an improved integrated form is provided that enhances the use by end users and the manufacturing of such forms. In one form, there is provided an integrated from that includes a first printable substrate on one side of the form and a liner adjacent the first printable substrate. The liner has a first and second side. Adhesive on the first side of the liner maintains the first printable substrate to the first side of the liner in a manner that facilitates printing on the form without detachment of the first printable substrate. The first side of the liner is treated to permit a predetermined force to selectively remove the first printable substrate from the linear such that adhesive removes with the first printable substrate.

The first printable substrate may include a weakened line of substrate that defines at least in part a predetermined sized portion of substrate removable from the form. The weakened line of substrate resists unintentional detachment of the first printable substrate from the liner. The first printable substrate also may include a portion that extends beyond the liner.

The form may further include a second printable substrate on the other side of the form. The liner is intermediate the first and second printable substrates. Adhesive on the second side of liner maintains the second printable substrate to the second side of the liner in a manner that facilitates printing on the form without detachment of the second printable substrate. The second side of the liner being treated to permit a predetermined force to selectively remove the second printable substrate from the linear such that adhesive removes with the second printable substrate.

The second printable substrate also may include a weakened line of substrate that defines at least in part a predetermined sized portion of substrate removable from the form. The weakened line of substrate resists unintentional detachment of the second printable substrate from the liner.

The first printable substrate may also include a portion adjacent the removable portion of substrate that has been removed from the form to facilitate manual removal of the removable portion of substrate.

In another form, there is provided an integrated form that includes a printable substrate having a first side, a second side and a removable portion. A first layer of laminate covers at least a portion of one of the first and second sides of the printable substrate such that at least the removable portion of the printable substrate is covered. The first layer of laminate has a portion that is removable with the removable portion of the printable substrate. A second layer of laminate covers at least a portion of the first layer of laminate such that the second layer holds the removable portion of the substrate and first layer of laminate in the form while also allowing a predetermined force to remove the removable portion of the first layer of laminate and printable substrate from the form.

The integrated form may include a line of weakness extending through both the printable substrate and the first layer of laminate to define at least in part the removable portion of the printable substrate. The removable portion of the printable substrate also may have perimeter portion and the second layer of laminate may affix to the first layer of laminate only at the perimeter portion of the printable substrate. The form also may include a second portion of the printable substrate that is removable to facilitate removal of the other removable portion.

There also is provided a method of making an integrated form. The method includes the steps of providing a first printable substrate and providing a liner having a first and second side. Adhesive is applied to the first sides of the liner, and the first printable substrate is mated to the first side of the liner. Weakened lines of substrate in the first printable substrate are formed to define a label of predetermined size.

The method may include the steps of providing a second printable substrate, applying adhesive to the second side of the liner and mating the second printable substrate to the second side of the liner. Weakened lines of substrate may be formed in the second printable substrate to define a label of predetermined size.

The method also may include the steps of blocking the application of adhesive to a portion of the liner to be mated with the first printable substrate and removing a portion of the first printable substrate to facilitate easy removal of the label.

In another manner, there is provided a method of making an integrated form that includes the steps of providing a printable substrate having a first side and second side, applying a first layer of laminate to the second side of the printable substrate and applying a second layer of laminate to the first layer of laminate. Cut lines are formed through the printable substrate and the first layer of laminate to define a removable portion of the form being maintained in the form by the second layer of laminate until intentional removal from the form.

The method may include the step of removing a portion of the second layer of laminate across the removable portion of the printable substrate to reduce the amount a force necessary to remove the removable portion from the form. The method also may include cutting of a removable section of the form adjacent to the removable portion to facilitate removal of the removable portion.

DETAILED DESCRIPTION OF THE PREFERRED EMBODIMENT

Figure 1:
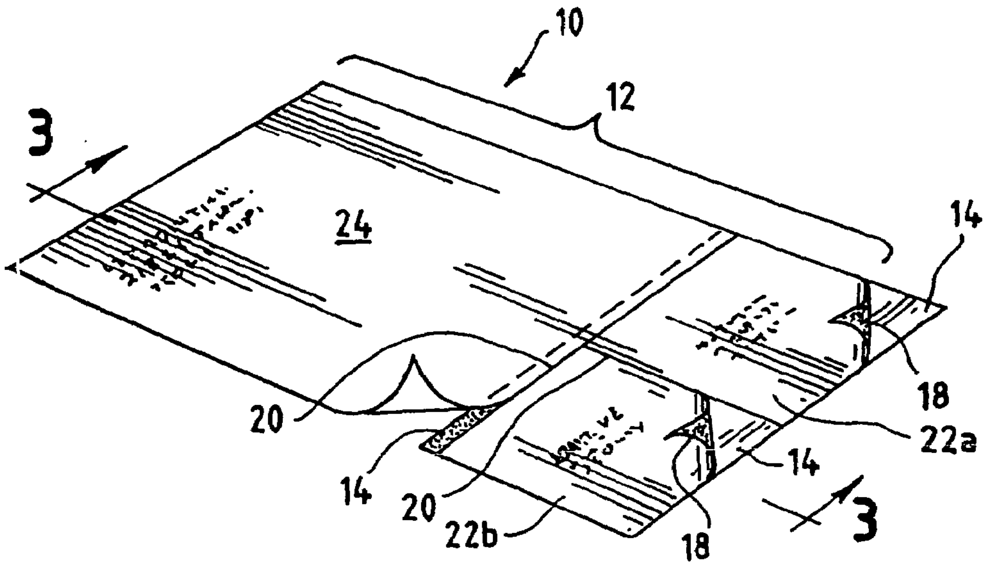
FIG. 1 is a top perspective view of an integrated label form embodying features in accordance with the present invention.
Figure 2:
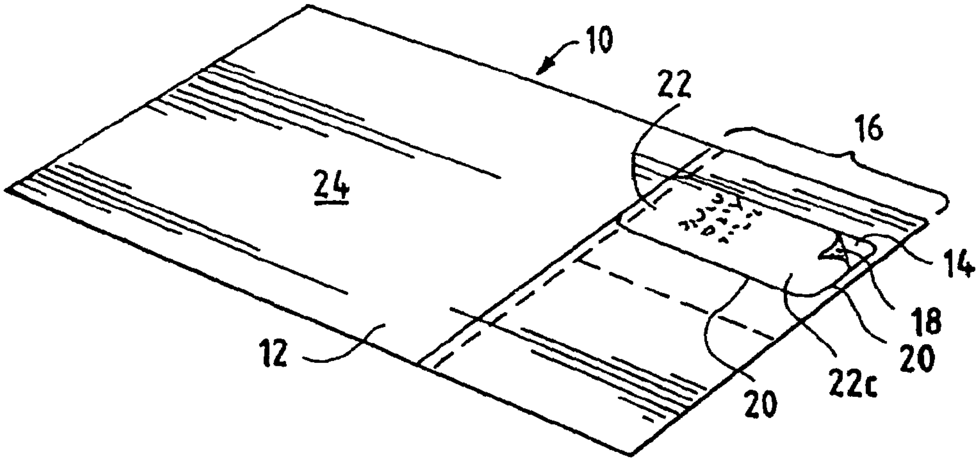
FIG. 2 is a bottom perspective view of the integrated form of FIG. 1.
Figure 3:
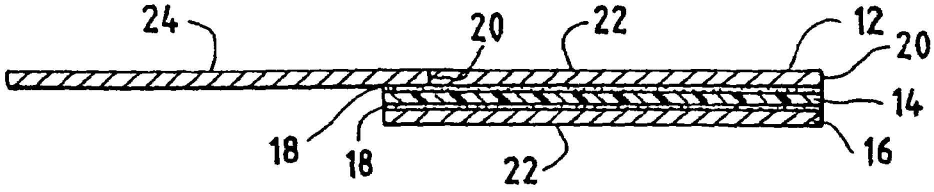
FIG. 3 is a cross-section view taken along line 3—3 of the integrated form of FIG. 1.
Figure 4:
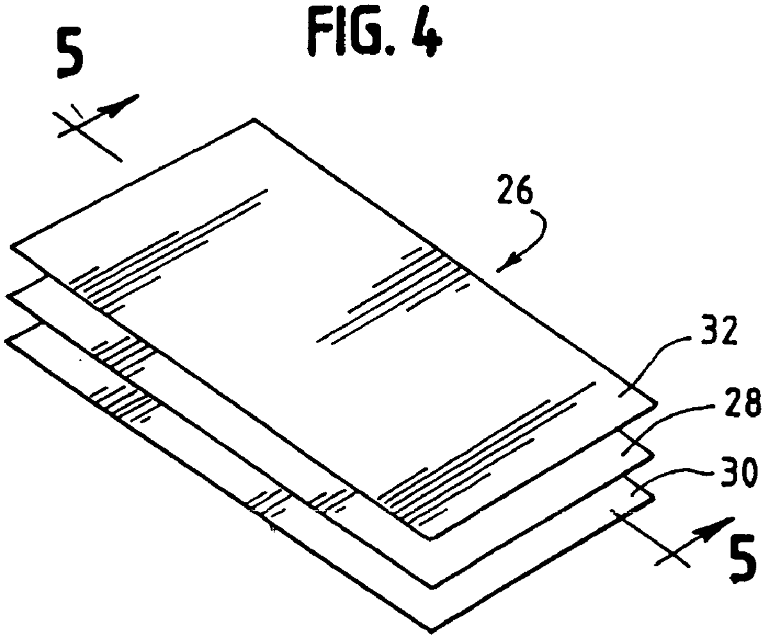
FIG. 4 is an exploded perspective view of another embodiment of an integrated label form in accordance with the present invention.

Referring to FIGS. 1–3, there is illustrated a form 10 embodying the truly integrated label features of the present invention. The integrated form 10 facilities reliable printing by the end user and convenient labels for the end user as well as others (such as consumers).

The form 10 is composed of three substrate layers: a top printable substrate 12; an intermediate liner substrate 14; and a bottom printable substrate 16. The top and bottom substrates 12 and 16 are made of material that is capable of being readily printed on using conventional printers, such as laser printers. Such materials include paper, card stock or even printable polymer based substrates.

The liner substrate 14 is mated to the top and bottom substrates 12 and 16 with a pressure sensitive adhesive 18 on both sides. The liner substrate 14 is made of material and treated such that it has reduced binding characteristics to allow a label portion 22 to be easily separated for use by the end user but that will not become detached during printing. Such liner material includes silicone coated glassine, on both sides, as well as Teflon® coated glassine, and bleach-craft may be substituted for glassine.

In manufacturing the form 10, the top and bottom printable substrates 12 and 16 are mated to the liner substrate 14 by adhesive 18. The adhesive 18 is hot melt adhesive or any other adhesive capable of releasably attaching the substrates 12 and 16 to liner substrate 14. The form 10 is then sent through a die press to create weakened lines 20 on the top substrate 12 to define top labels 22*a* and 22*b* and on the bottom substrate 16 to define bottom label 22*c*. As a result, dedicated sections of the printable substrates 12 and 16 become the labels 22*a* and 22*b*, thereby providing a form 10 with truly integrated labels.

Alternatively, the bottom side of liner 14 may already include the bottom printable substrate 16, (a pre-labeled liner). In this case, adhesive 18 is applied to the side of the liner 14 not having the label 22*c*, and mated to first printable substrate 12. The combination of substrates is then taken through a die press where the first printable substrate is pressed creating labels 22*a* and 22*b*. Alternatively, the pre-labeled liner 14 may not have been die pressed as of yet thereby requiring the second printable substrate 16 to be die pressed as well.

As illustrated in FIG. 1, the top printable substrate 12 includes two labels 22*a* and 22*b*. The remainder 24 of the top substrate 12 is left to supply printed information that does not required transfer capability via a label. Hence, the liner 14 does not extend below portion 24 of the top substrate 12. As an example, if the form 10 was an integrated label invoice form, section 24 would include the order information 22, label 22*a* would be the shipping label, label 22*b* would be the return shipping label and label 22*c* would be an additional label for other purposes. Thus, the form 10 only consumes the minimal amount of material necessary to provide the required form space and number of labels.

Where additional labels are required because more of the information on the form must be transferred, an alternate form 26 is constructed in which a larger liner substrate is incorporated into the form. Referring to FIGS. 4–7, the form 26 includes a liner substrate 28 and/or a bottom printable substrate 30 that extends over as much of the top printable substrate 32 as is necessary to provide the desired number and size of labels. As a result, the cost of supplying additional labels to transfer more information is reduced because labels are formed on both sides of the liner substrate 28 with the top substrate 32 and the bottom substrate 30.

Figure 5:
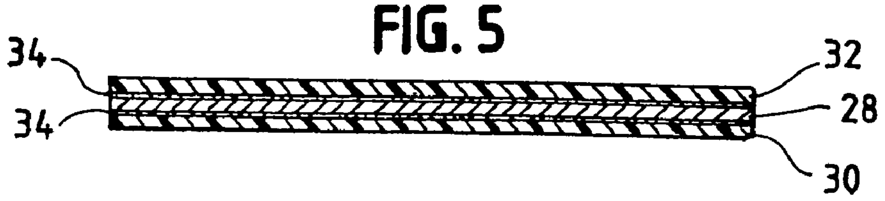
FIG. 5 is a cross-sectional view taken along line 5—5 of the integrated from of FIG. 4 as assembled.
Figure 6:
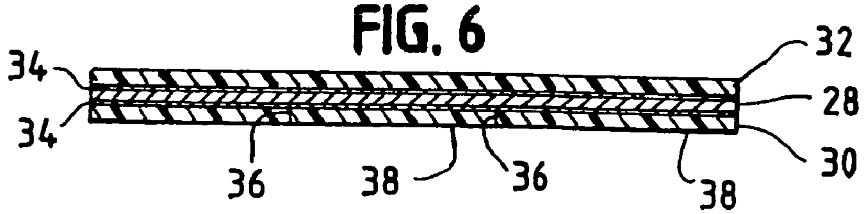
FIG. 6 is a cross-sectional view of an integrated form similar to that illustrated in FIG. 5 with the addition of multiple labels on one side.
Figure 7:
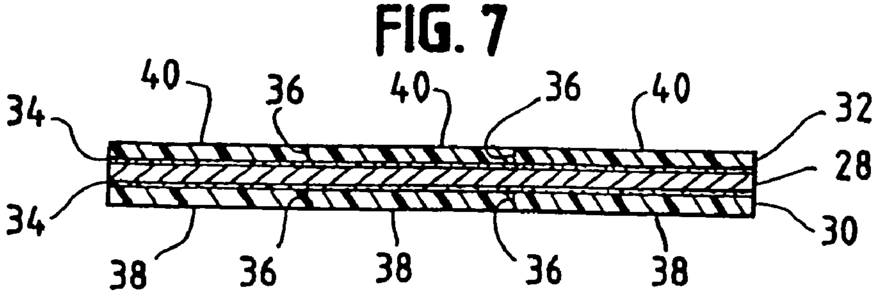
FIG. 7 is a cross-sectional view of an integrated form similar to that illustrated in FIG. 6 with the addition of multiple labels on both sides.

More specifically, as illustrated, the liner substrate 28 and the bottom substrate 30 are sized such that their edges are co-extensive with the top substrate 32. The liner substrate 26 is intermediate the top substrate 32 and the bottom substrate 30, and is affixed to such substrates with an adhesive 34. As illustrated in FIG. 5, the bottom and top substrates 30 and 32 each constitute one large label. As illustrated in FIG. 6, the top substrate 32 constitutes one large label, and the bottom substrate 30 is die cut to include cut lines 36 that define a number of labels 38. As illustrated in FIG. 7, the top substrate 32 also is die cut to include cut lines 36 which define a number of labels 40. The material for the top and bottom substrates (32 and 30), the liner 26 and the adhesive 34 is the same as that described above for form 10 of FIGS. 1–3.

Figure 8:
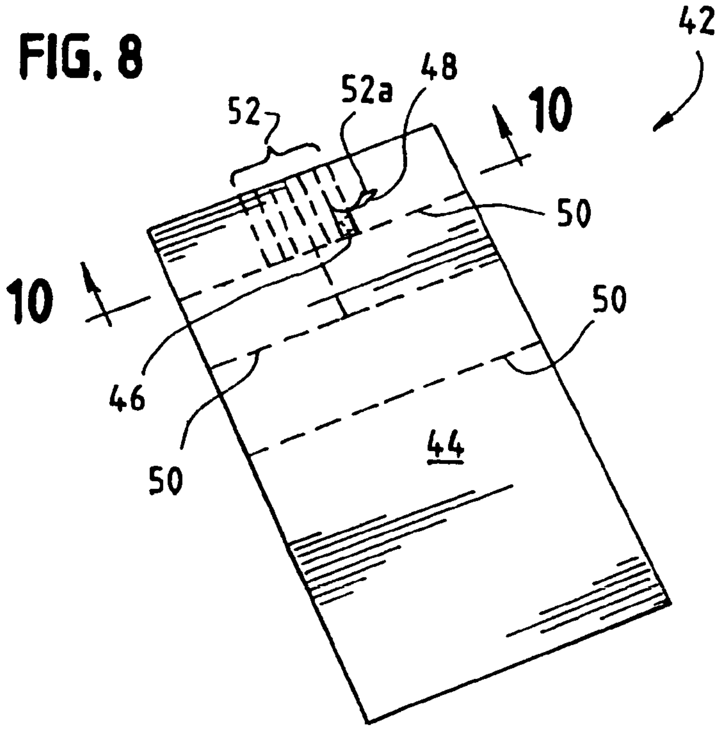
FIG. 8 is a top perspective view of another embodiment of an integrated label form in accordance with the present invention.
Figure 9:
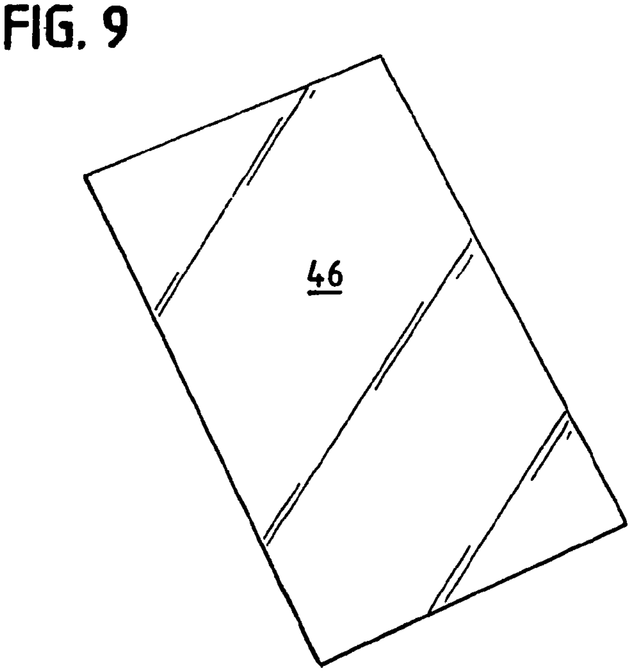
FIG. 9 is a bottom perspective view of the integrated from of FIG. 8.
Figure 10:
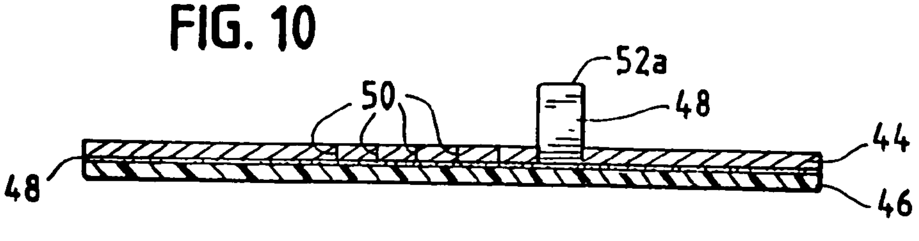
FIG. 10 is a cross-sectional view taken along line 10—10 of the integrated form of FIG. 8.
Figure 11:
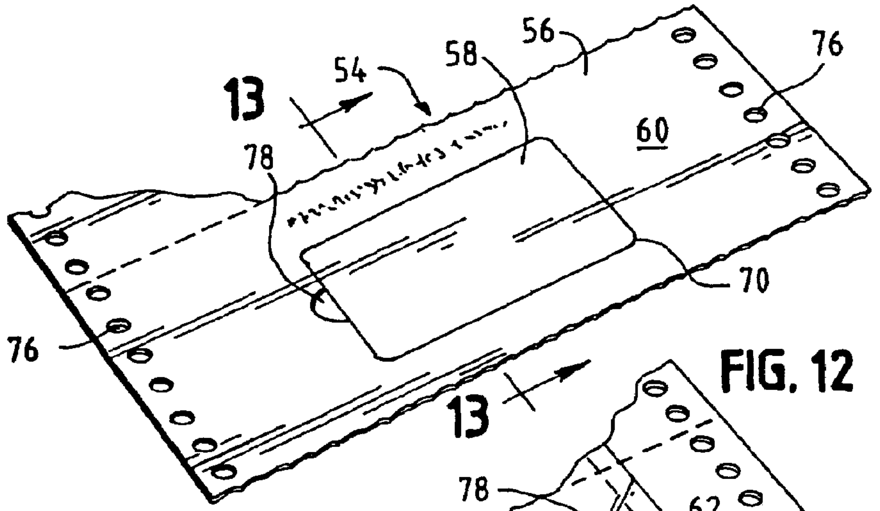
FIG. 11 is a top perspective view of an integrated card form embodying features in accordance with the present invention.
Figure 12:
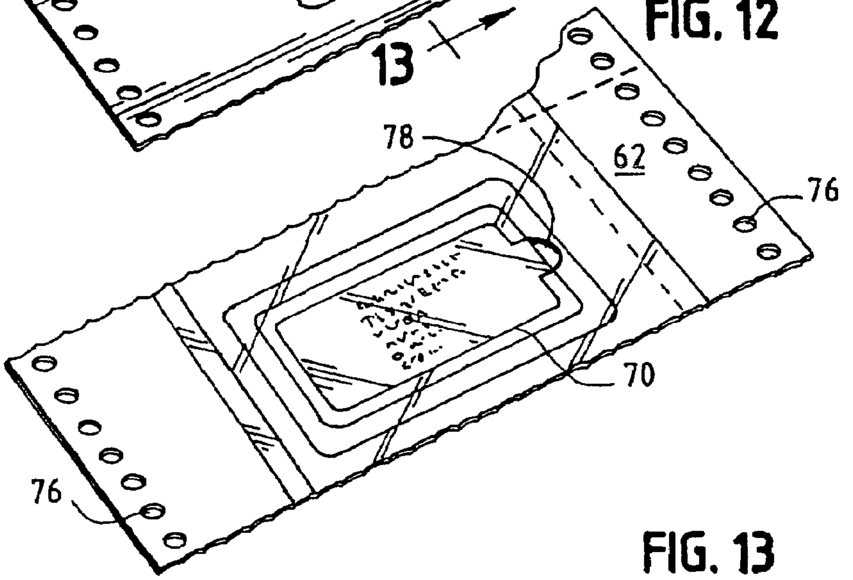
FIG. 12 is a top perspective view of the integrated card form of FIG. 11 with card removed.
Figure 13:
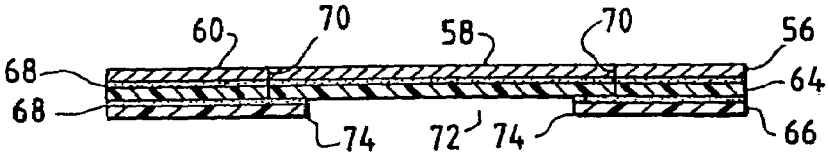
FIG. 13 is a cross-sectional view taken along line 13—13 of the integrated card form of FIG. 11.
Figure 14:
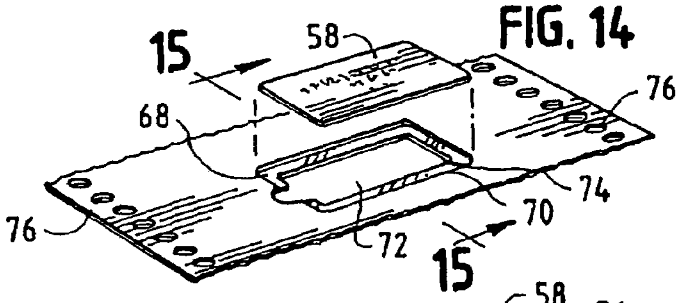
FIG. 14 is an exploded perspective view of the integrated card form of FIG. 11.
Figure 15:
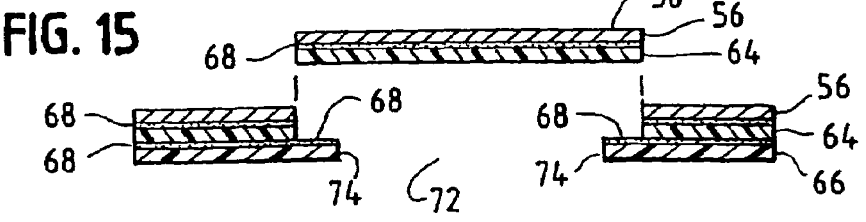
FIG. 15 is a exploded cross-sectional view taken along line 15—15 of the integrated card form of FIG. 14 with a corresponding cross-section of the card suspended above.
Figure 16:
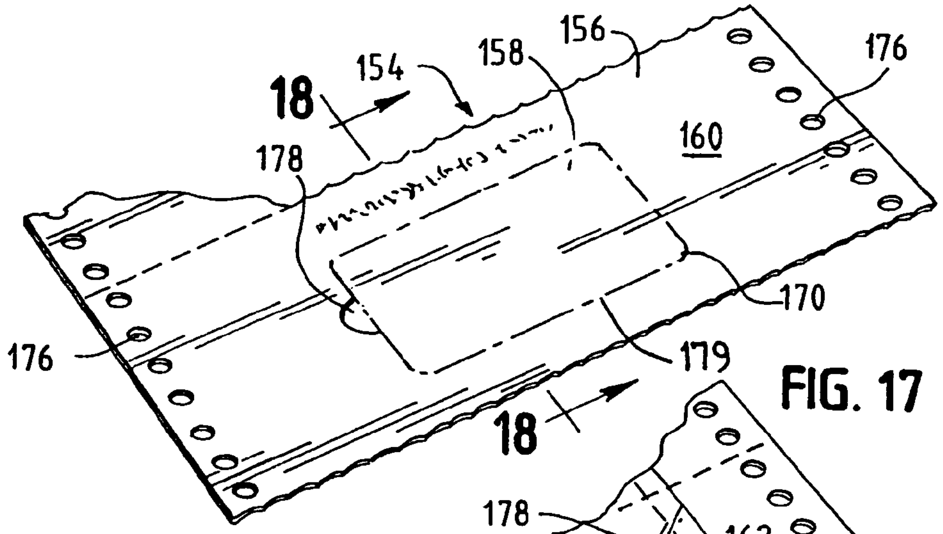
FIG. 16 is a top perspective view of another embodiment of an integrated card form embodying features in accordance with the present invention.

Referring to FIGS. 8–10, an integrated label form 42 in accordance with another aspect of the invention is shown. The form 42 includes a printable substrate 44 and a liner substrate 46. With form 42, the liner substrate 46 does not include any indentations or deformations as a result of die cutting to form the labels because the printable substrate 44 is die pressed before being mated to the liner substrate 46. By die pressing printable substrate 44 prior to mating it with liner substrate 46, the liner substrate 46 is not exposed to any possibility of being weakened or deformed due to the die cutting process. This ensures that the liner substrate 46 will be as smooth and uniform as possible, and increases the likelihood that the integrated form 42 will print properly.

More specifically, the printable substrate 44 is affixed to the liner substrate 46 by adhesive 48. Prior to affixing these substrates, the printable substrate 44 is die pressed to form lines of weakness 50 (or perforations) that define a number of labels 52. As illustrated with label 52*a*, one can easily peal the labels from the liner substrate 46 along the lines of weakness 50. The adhesive 48 lifts off the liner substrate 46 and remains with the label 52*a* so that it can be transferred and affixed to another surface.

To manufacture this form 42, the printable substrate 44 is printed with the desired graphics and/or text and is then die pressed to designated the labels 52 with the appropriate lines of weakness 50. Finally, the printed substrate 44 is mated to the liner with the adhesive 48.

Referring to FIGS. 11–15, there is illustrated an integrated card form 54 embodying features of the present invention. The form 54 includes a printable substrate 56 from which is formed a card 58. The printable substrate 56 has a top side 60 and a bottom side 62 upon which both sides can be printed any desired graphics and/or text.

The bottom side 62 is covered with a first layer of laminate 64 over the card portion 58. The first layer of laminate 64 provides rigidity and protection to the card 58. A second layer of laminate 66 is affixed to the first layer 64 to hold the card 58 in place in the form. Both layers of laminate include a layer of adhesive 68 on one side for affixation to the substrate 56 and the other layer of laminate 64.

The card 58 is defined by a number of lines of weakness or cuts 70 die cut through the substrate 56 and the first layer of laminate 64. The second layer of laminate 66 includes an aperture 72 at the card 58 which is defined by a ledge 74 that extends inward beyond the cuts 70 to expose the adhesive 68 to secure the card 58 in place. The ledge may have a width of ⅛th of an inch width.

In other words, the card 58 rests against the ledge 74 and the adhesive 68 at the ledge 74 affixes to the first layer of laminate 74 about the perimeter portion of the card 58 in a manner that prevents unintentional release of the card 58 while also allowing the card 58 to be intentionally removed. For instance, to remove the card 58, one can easily press from the backside of the card 58 to push the card from the form 54. The size of the ledge 74 and the amount and type of adhesive 68 is coordinated to provide the appropriate gripping action on the card 58.

Alternatively, the second layer of laminate may not have an aperture, but may act as a transparent window exposing the bottom of the card. In this instance, it is preferred that the entire window area not be covered completely with adhesive to facilitate removal of the card.

To manufacture the integrated card form 54, the top side 60 and bottom side 62 of card 58 are printed with graphics and text as desired. Next, the first layer of laminate 64 is mated with the back side of substrate 56 and then the second layer of laminate 66. The lines of weakened substrate or cuts 70 are die cut from the top side 60 of the substrate 56 through the first layer of laminate 64 to form the card 58. The second layer of laminate 66 is not cut so that it can hold the card 58 in the form 54 against unintentional detachment. Alternatively, the second layer of laminate 66 may be cut to remove a portion at the card and to form the ledge 74. This is performed prior to mating the second layer of laminate 66 with the first layer of laminate 64. The entire process is to be done on a single machine. Feed structure 76 is provided to aid with feeding the integrated form through a printer (not shown). However in alternate embodiments no feed structure 76 may be provided.

To further assist in card removal, the form 54 also includes a recess 78 adjacent the card 58 for one to insert a finger, thumb, or part thereof to facilitate removal. The recess extends through the printable substrate 56 and both the layers of laminate 64 and 66. Recess 78 could be used in a similar manner in integrated form 10 (FIGS. 1–3), form 26 (FIGS. 4–7), and form 42 (FIGS. 8–10). That is, a portion of the substrate could be die cut prior to being mated with the liner and the liner could be blocked from receiving adhesive at that section. As a result, a portion of the liner is exposed and one can easily peel the label from the liner to separate it from the form.

Turning now to a variation on the business form 54 having an integrated removable card 58 as discussed above with respect to FIGS. 11–15, a business form 154 is provided having a removable integrated card 158 attached by gaps between perforations 170. The business form 154 is constructed using a base layer 156 and a liner layer 164, as disclosed in FIGS. 16–20. The base layer 156 is attached on one of its sides to the liner layer 164 using adhesive 168. The integrated removable card 158 comprises at least a portion of the base layer 156 and the liner layer 164 of the business form 154. By using only two layers, the base and liner layers 156 and 164, to generally produce the form 154, the amount of material used in producing the form 154, and thus the cost of the form 154, can be reduced as compared to having more than two layers. However, other layers, such as the cover layer discussed below, may also be combined with the base and liner layers 156 and 164 of the form 154.

The card 158 has a periphery edge substantially defined by a plurality of die cuts 170 extending substantially through both the base and liner layers 156 and 164. The plurality of die cuts or perforations 170 and gaps therebetween form a perforated periphery of the card 158. The perforated periphery of the integrated removable card 158 allows for the card 158 to readily be removable from the business form 154, while also maintaining the card 158 in the business form 154 and protecting against unintentional removal. To this end, the perforations 170 are spaced apart a sufficient distance from adjacent perforations 170 in order to have a plurality of bridging portions 179 disposed therebetween to assist in maintaining the card 158 in the form 154 against unintentional removal from the form 154.

An optional cut-out 178 is positioned adjacent the periphery of the card 158 to assist in removal of the card 158 from the form 154. The cut-out 178 preferably extends through both the base and liner layers 156 and 164 of the integrated business form 154. Feed holes 176 optionally may be positioned on opposing longitudinal edges of the form 154.

Figure 17:
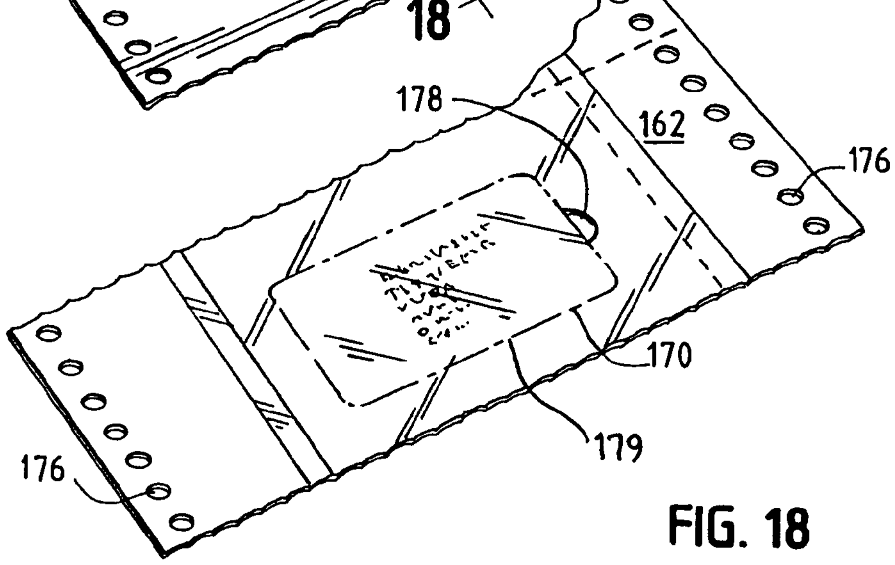
FIG. 17 is a bottom perspective view of the integrated card form of FIG. 16.
Figure 18:
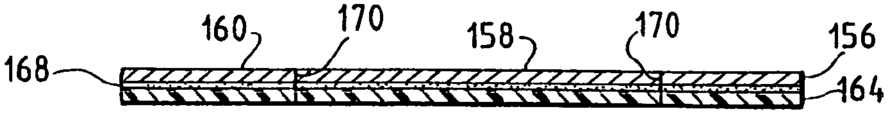
FIG. 18 is a cross-sectional view taken along line 18—18 of the integrated card form of FIG. 16.
Figure 19:
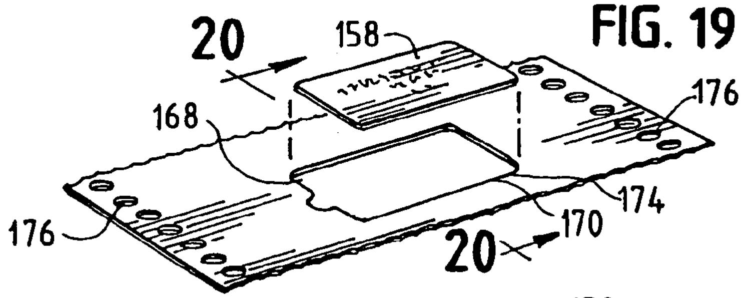
FIG. 19 is an exploded perspective view of the integrated card form of FIG. 16.
Figure 20:
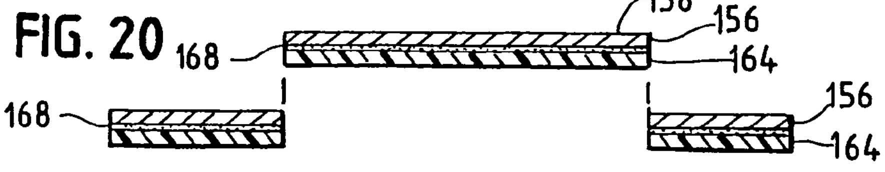
FIG. 20 is a exploded cross-sectional view taken along line 20—20 of the integrated card form of FIG. 19 with a corresponding cross-section of the card suspended above.

The base layer 156 is generally rectangular and the liner layer 164 extends generally along the entirety of at least one of the dimensions of the base layer 156, as illustrated in FIGS. 16–20. As shown in FIG. 17, however, the liner layer 164 need not completely cover the base layer 156.

The base layer 156 has a printable first side 160 and an opposing printable second side 162. Preferably, the base layer 156 may be printed, either before or after construction of the business form 154, such as by using either a printing press or a typical office or home printer. The base layer 156 may be formed of a cardstock material and the liner layer 164 may be formed of a transparent film. Forming the liner layer 164 of a transparent film allows for any printing or other indicia on the second side 162 of the base layer 156 to be visible through the liner layer 164. Unprinted space capable of receiving printed indicia may also be provided on the first side 160 of the card 158.

A cover layer may be adhesively attached to the first side 160 of the base layer 156 opposite the liner layer 164. The cover layer may be at least partially transparent, permitting printing or other indicia on the first side 160 of the base layer 156 to be visible through the cover layer. When the cover layer and liner layer 164 are both used on the business form 154, additional stiffness of the removable card portion 158 can be achieved. The cover layer or liner layer 164 may comprise materials selected to allow for printing of indicia thereon.

A method is also provided of making a business form 154 having an integrated removable card portion 158, such as the form illustrated in FIGS. 16–20. The method includes providing a base layer 156 having a first side 160 and an opposing second side 162. A liner layer 164 is secured using adhesive 168 to at least a portion of the second side 162 of the base layer 156. Printing on both the first and second sides 160 and 162 of the base layer 156 may occur prior to attachment of the liner layer 164, and/or the first side 160 of the base layer 156 may be printed after attachment of the liner layer 164. Printing may also be placed on the liner layer 164. After the liner layer 164 is secured to the base layer 156, a plurality of spaced die cuts 170 extending substantially through the base and liner layers 156 and 164 are formed. Bridging portions 179 disposed between adjacent die cuts 170 remain to connect the card 158 and the form 156 so that the card 158 is maintained in the form 156 against unintentional removal therefrom. A cut-out 178 is cut through the base and liner layers 156 and 164 adjacent the periphery of the card 158 to facilitate removal of the card 158 from the form 156.

Figure 21:
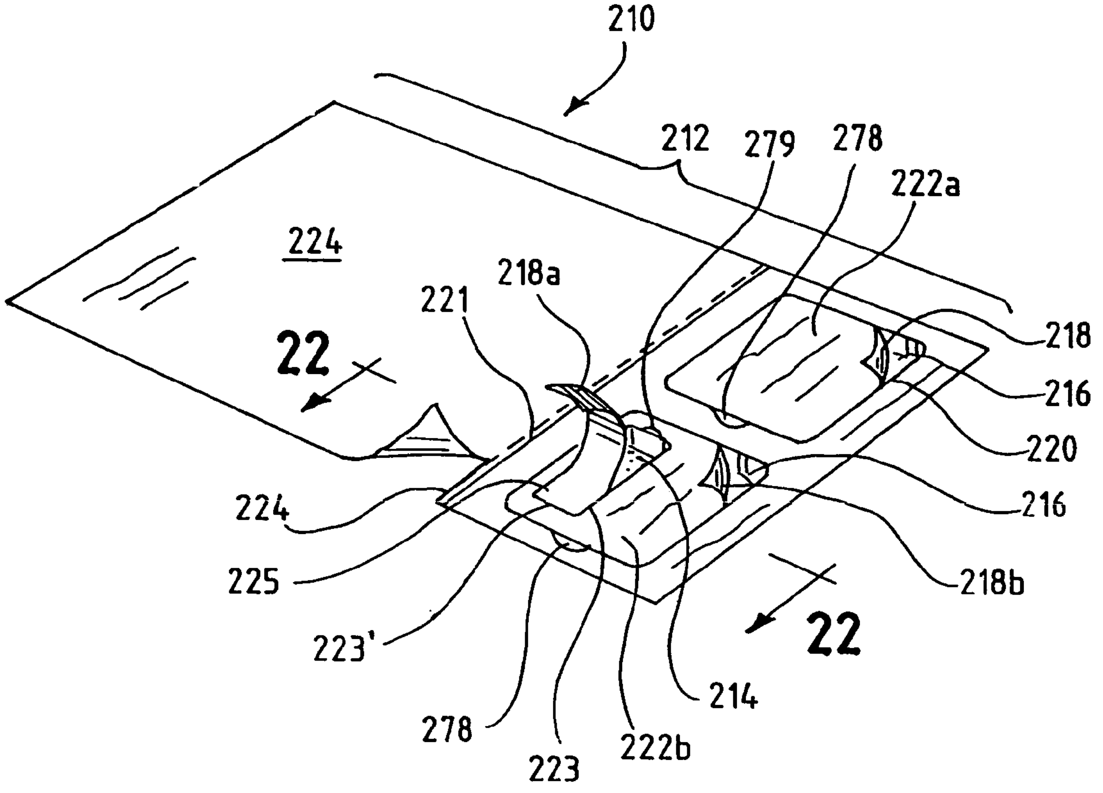
FIG. 21 is a top perspective view of an integrated label form embodying features in accordance with the present invention.
Figure 22:
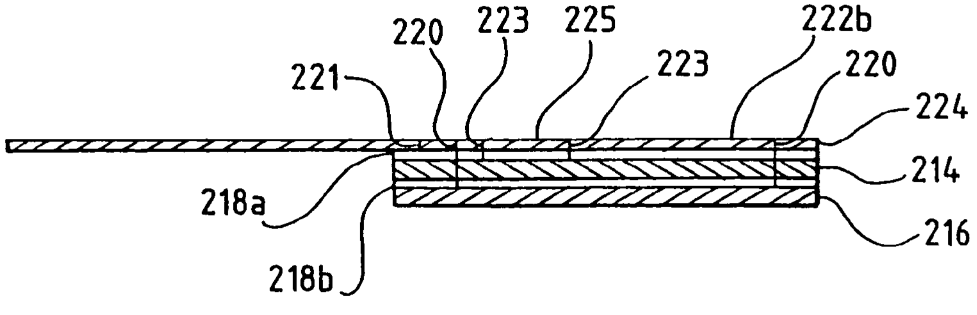
FIG. 22 is a cross-section view taken along line 22—22 of the integrated form of FIG. 21.

A business form 210 having removable integrated portions **222*a* and 222*b*, similar to the removal integrated portions 22*a* and 22*b* discussed above with respect to FIGS. 1–3, is provided having an integrated tab 225, as shown in FIGS. 21 and 22. The integrated tab 225 is provided in one or both of the removal integrated portions 222*a* and 222*b* of the business form 210. One or both of the removable integrated portions 222*a* and 222*b* of the form 210 may be removed and, for example, adhered onto an object, such as an envelope or a package. The integrated tab 225 of the removable integrated portion 222*b* can be at least partially removed to expose a previously hidden or covered portion of a liner layer 214 of the removable integrated label portion 222*b*, as shown in FIG. 21**.

The business form comprises a base layer 224, the liner layer 214, and a backing layer 216, as shown in FIG. 22. The liner layer 214 is secured using adhesive **218*a* to at least a portion of the base layer 224. The backing layer 216 is secured using adhesive 218*b* to at least a portion of the liner layer 214 on a side of the liner layer 214 opposite the base layer 224**.

A top printable substrate 212 includes two regions 221 and 224, a region 221 having the integrated removable portions **222*a* and 222*b* and a region 224 lacking the integrated removable portions, as illustrated in FIG. 21. As illustrated, the remainder region 224 of the top substrate 212 does not have integrated removable portions 222*a* and 222*b*. The liner and backing layers 214 and 216 are only positioned below the region 21 of the top substrate 212. Thus, the form 210 may only consume the minimal amount of material necessary to provide the required form space and number of labels. However, the entire form 210 may have integrated removable portions and, therefore, the liner and backing layers 214 and 216 extending under the base layer 224. Although the business form 210 is described and depicted in FIGS. 21 and 22 as having two integrated removable portions 222*a* and 222*b*, one of which has an integrated tab 225**, multiple integrated portions may be provided on the business form and one or more tabs may be provided on each integrated removable portion.

The integrated removable label portion **222*a* and 222*b* of the form 210 comprises at least a portion of the base layer 224 and the liner layer 214. The integrated removable portion has a periphery edge substantially defined by a first die cut 220 extending substantially through the base and liner layers 224 and 214 so that the backing layer 216 maintains the integrated removable portion 222*a* or 222*b* in the form 210 against unintentional removal from the form 210. To remove the integrated removable portion 222*a* or 222*b* from the form 210, the portion 222*a* or 222*b*, comprising the base layer 224 and the liner layer 214, is separated from the backing layer 216. A cut-out 278 may be positioned adjacent the integrated removable portion 222*a* or 222*b* and may extend through the base, liner and backing layers 224, 214 and 216 to assist in removal of the integrated removable portion 222*a* or 222*b* from the form 210**.

The side of the backing layer 216 adjacent the liner layer 214 may have a lesser affinity for the adhesive **218*b* than the adjacent side of the liner layer 214, thereby allowing the adhesive 218*b*, once the integrated removable portion 222*a* or 222*b* of the form 210 is removed, to remain on the side of the liner layer 214 opposite the base layer 224. Thus, the integrated removable portion 222*a* or 222*b* comprises a label that can be adhered to an object. Alternatively, the side of the backing layer 216 adjacent the liner layer 214 may have a greater affinity for the adhesive 218*b* than the adjacent side of the liner layer 214, thereby allowing the adhesive 218*b*, once the integrated removable portion 222*a* or 222*b* of the form 210 is removed, to remain on the side of the backing layer 216. In this aspect, the integrated removable portion 222*a* or 222*b*** may comprise a card.

The integrated tab 225 may be opened either before or after removal of the integrated removable portion **222*b* from the form 210. The integrated tab 225 comprises a portion of the base layer 224 and is coextensive with the integrated removable portion 222*b*. The integrated tab 225 is at least partially removable from the base layer 224. A periphery edge of the integrated tab is generally defined by a plurality of die cuts 223 extending substantially through the base layer 224 so that the liner layer 214 at least partially maintains the integrated tab 225 in the integrated removable portion 222*b* against unintentional removal from the portion 222*b***.

The integrated tab 225 can be lifted to expose a portion of the liner layer 214. The integrated tab 225 may be at least partially hinged to the base layer 224, such as by an uncut portion or partially uncut portion 223' extending therebetween, as illustrated in FIG. 21. Alternatively, the integrated tab 225 may be completely removable from the removable integrated portion **222*b*. A cut-out 279 may extend through the base and liner layers 224 and 214 of the integrated removable portion 222*b* and may be positioned adjacent the periphery edge of the tab 225 to allow the tab 225 to be readily removed from the integrated removable portion 222*b***.

The base layer 224 may have a lesser affinity for retaining the adhesive **218*a* than the adjacent side of the tab 225, thereby allowing the tab 225 to be removed from the removable integrated portion 222*b* and adhered to an object. Alternatively, the base layer 224 may have a greater affinity for retaining the adhesive 218*a* than the adjacent side of the tab, thereby allowing the adhesive 218*a* to remain on the removable integrated portion 222*b*, as opposed to on the adjacent side of the tab 225, after removal of the tab 225**.

Various combinations of printing on different locations of the form 210 can be used to customize usage of the form 210. To facilitate such uses, any or all of the components, such as the base, liner and backing layers 224, 214 and 216 may comprise materials suitable for being printed upon. For example, the form 210 may comprise an invoice for an item receivable via shipping. As an example, region 224 could include the order information, label 222*a* could be the shipping label, and label 222*b* could be the return shipping label. A barcode or other information may be printed on the portion of liner layer 214 beneath the integrated tab 225 such that when the integrated tab 225 is lifted or removed, the information is exposed. Alternatively or in addition, information may be printed on one or both sides of the integrated tab 225. Thus use of the tab 225 allows for the selective display or access to the printing on the side of the tab 225 adjacent the liner layer 214 or on the portion of the liner layer 214 disposed beneath the tab 225 and visible once the tab 225 is opened or removed.

A method of making the business form 210 having the integrated removable portions 222*a* and 222*b* and the tab 225 includes providing the base layer 224, using the adhesive 218*a* to secure the liner layer 214 to at least a portion of the base layer 214, and using the adhesive 218*b* to secure the backing layer 216 to the liner layer 214. A plurality of first die cuts 220 extending substantially through the base and liner layers 224 and 214 are made to define the periphery edges of the integrated removable portions 222*a* and 222*b*. A plurality of second die cuts 223 are made extending substantially through the base layer 224 and coextensive with the integrated removable portion 222*b* substantially define the periphery edges of the integrated tab 225.

Figure 23:
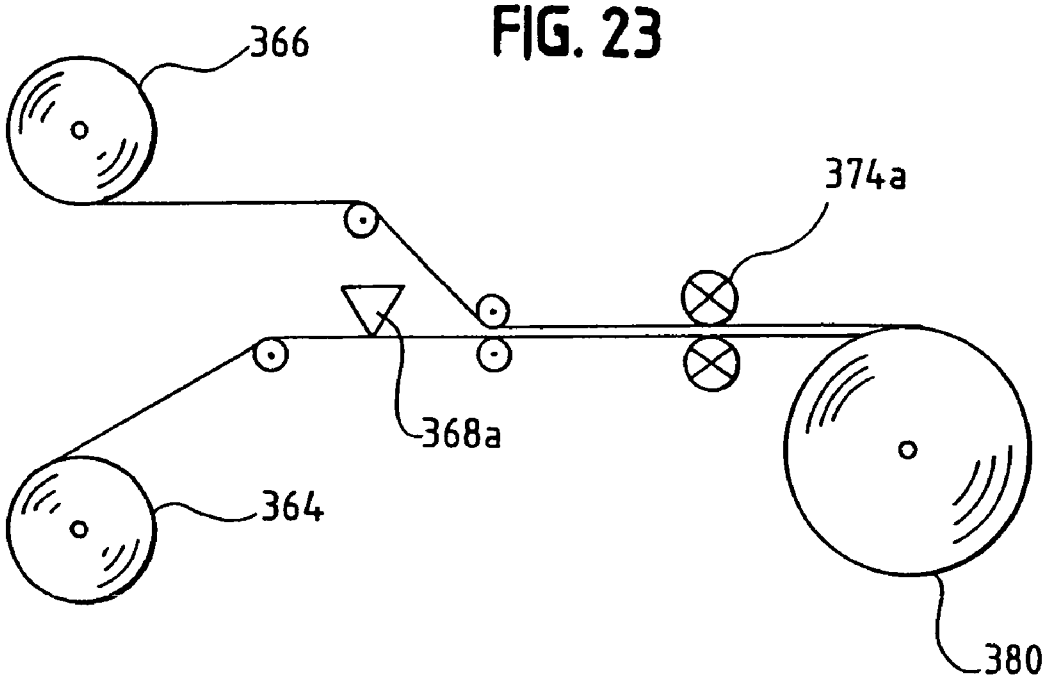
FIG. 23 is a schematic view of an apparatus and materials for making a precut laminate.
Figure 24:
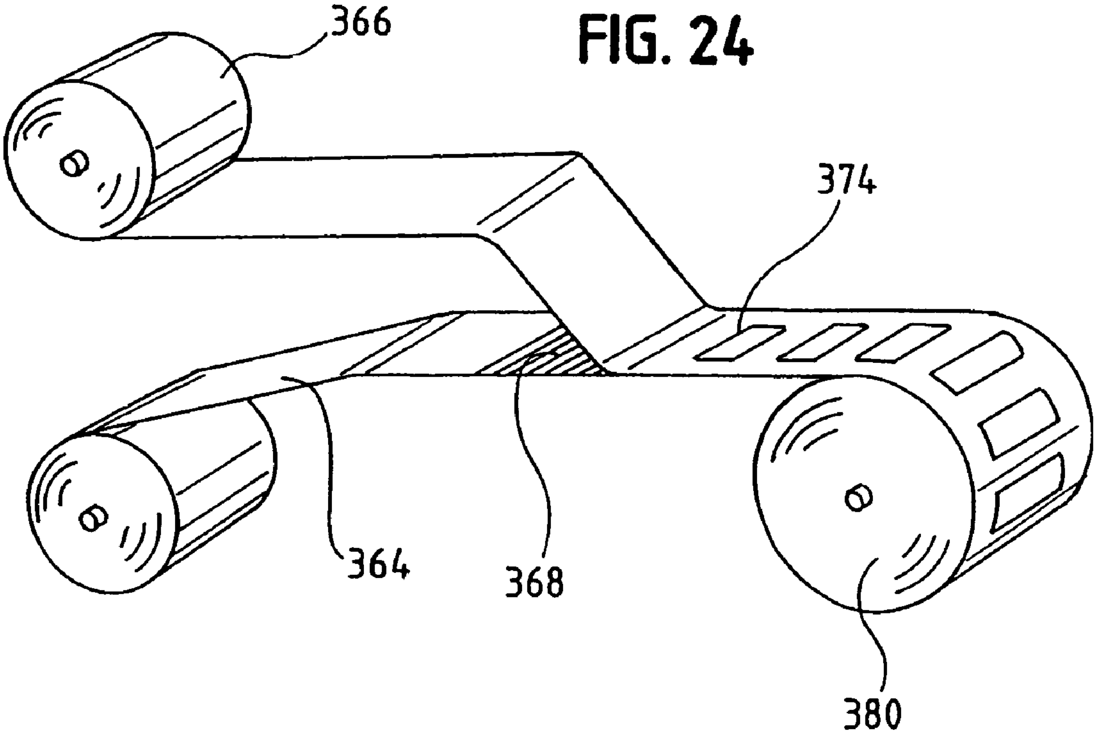
FIG. 24 is a perspective view of materials being used in the apparatus of FIG. 23 to make the precut laminate.

Business forms, such as those described above with respect to FIGS. 11–15, may be made in a process using a precut laminate 380 in one or more form manufacturing apparatus, as illustrated in FIGS. 23–26. The precut laminate 380 may comprise a backing layer 364 secured using adhesive 368 to a liner layer 366, as illustrated in FIG. 24. The precut laminate 380 has an integrated removable card portion 374 defined by a plurality of die cuts. The integrated removable card portion 374 can be left in the precut laminate 380. Alternative, and as illustrated in the card of FIGS. 11–15, the removable card portion 374 can be punched out and removed from the precut laminate 380. The die cuts are substantially through the the backing layer 364 but not completely through the liner layer 366, thereby allowing the integrated removable card portion 374 of the backing layer 364 to be supported by the liner layer 366.

After formation of the precut laminate, a base layer 360 is attached to the precut laminate 380, such as by using adhesive 369. A plurality of die cuts are formed substantially through the base and liner layers 360 and 366 in order to define an integrated removable card 370. The die cuts at least partially surround the integrated removable card portion 374 of the backing layer 364 so that the backing layer 364 maintains the card 370 in the form against unintentional removable from the form. A cut-out may be positioned adjacent the periphery of the card 370 and through the base, liner and backing layers 360, 366 and 364 in order to facilitate removal of the integrated card 370 from the form.

The apparatus used to produce the pre-cut laminate 380 receives the backing and liner layers 364 and 366, for example, in roll form, as illustrated in FIG. 23. The backing layer 364 is unwound and the adhesive 368 is applied thereto using an adhesive application station 368*a*. The liner layer 366 is also unwound, and is directed onto the adhesive 368 applied to the backing layer 364 in order to mate the backing and liner layers 364 and 366. Alternatively, the adhesive 368 may be applied to the liner layer 366 and the backing layer 364 mated therewith. After the adhesive 368 is applied and the backing and liner layers 364 and 366 are mated, a die cut station 374*a* makes the die cuts substantially through the backing layer 364 to define the integrated removable card portion 374 of the backing layer 364.

Figure 26:
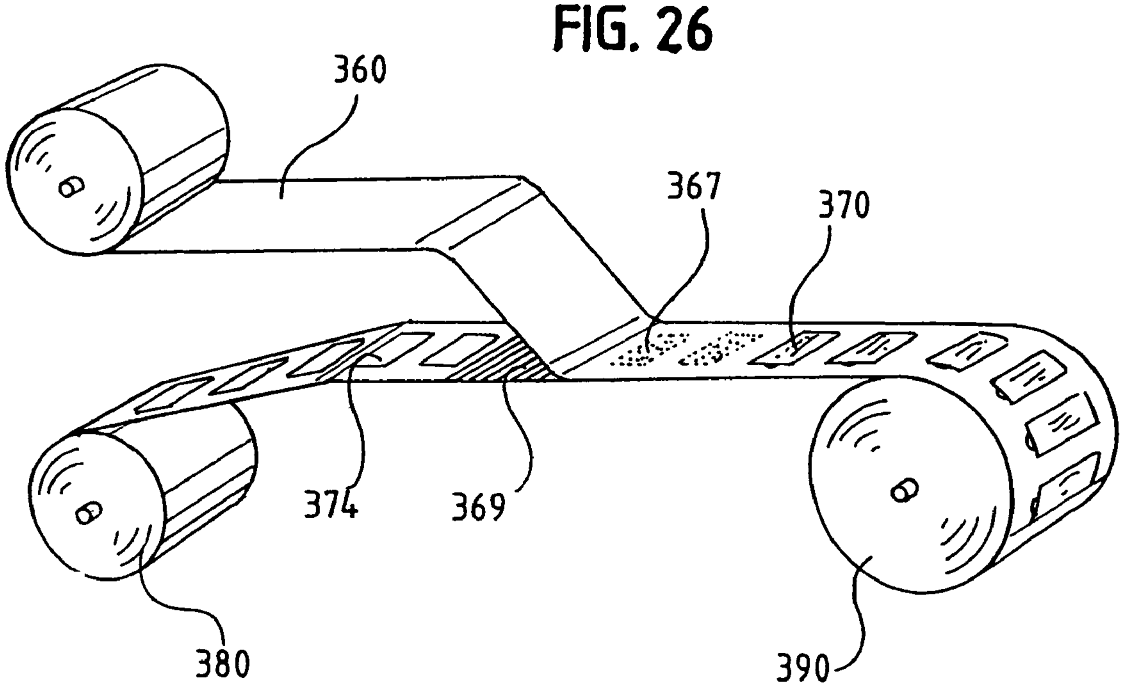
FIG. 26 is a perspective view of materials being used in the apparatus of FIG. 25 to make the business forms.

After die cutting, the precut laminate 380 is converted to in a dispensing configuration. The dispensing configuration is adapted to allow the precut laminate 380 to be attached using adhesive 369 to the base layer 360. For example, the dispensing configuration of the precut laminate 380 may be a roll which would allow the precut laminate 380 to be unwound into a generally planer feed configuration for feeding through the apparatus used to attach the base layer 360 to the precut laminate 380, as illustrated in FIG. 26. Another example of a dispensing configuration is a fan-folded configuration. For example, the fan-folding configuration may comprise one or more integrated removable card portions 374 in sheets that are folded relative to each other. The sheets of adjacent fan-folded stacks may be connected to allow for the continuous use of stacks of precut laminate 380 without having to stop the apparatus.

Figure 25:
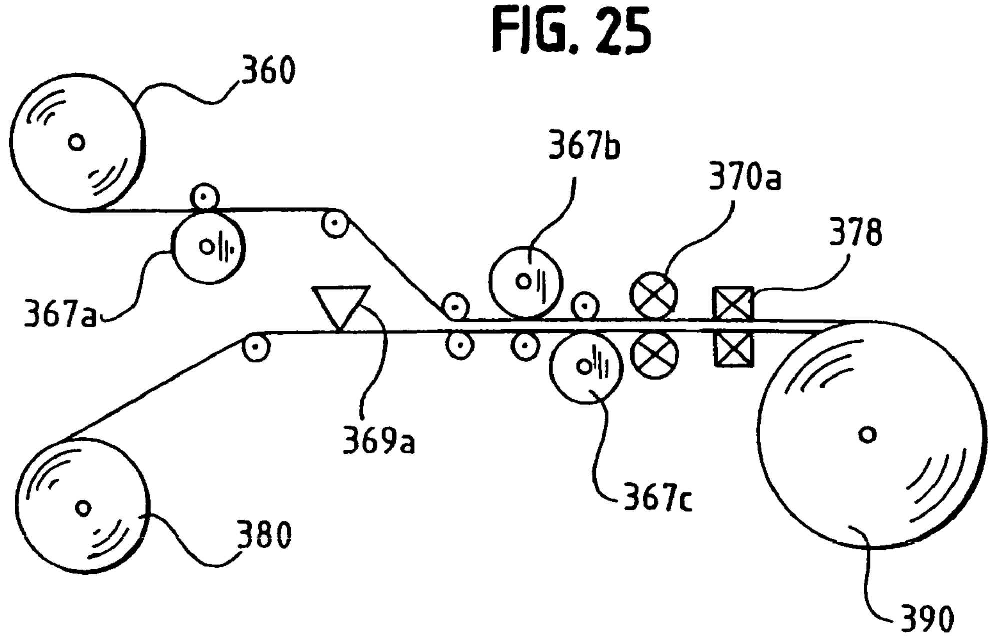
FIG. 25 is a schematic view of an apparatus and materials for making business forms using the precut laminate made using the apparatus of FIG. 23.

The apparatus used to produce the business form receives the pre-cut laminate 380 and the base layer 360, for example, in roll form, as illustrated in FIG. 25. The pre-cut laminate 380 is unwound and the adhesive 369 is applied to the liner layer 366 using an adhesive application station 369*a*. The base layer 360 is also unwound, and is directed onto the adhesive 369 applied to the liner layer 366 in order to mate the pre-cut laminate 380 and the base layer 360. Alternatively, the adhesive 369 may be applied to the base layer 360 and the pre-cut laminate 380 mated therewith. After the adhesive 369 is applied and the pre-cut laminate 380 and base layer 360 are mated, a die cut station 370*a* makes the die cuts substantially through the base layer 360 to define the integrated removable card 370. A cut-out for assisting in removal of the card 370 from the form may be made through the backing, liner and base layers 364, 366 and 360 and positioned adjacent the card 370 using a punching station 378. After manufacture of the forms, the forms may be provided in an output configuration, such as by winding into a roll 390, fan-folding, sheeting or the like.

Printing 367 may be placed on the business form and the components thereof at various stages, such as illustrated in FIG. 25. For example, printing may be placed upon the top and bottom sides of the base layer 360 using printing stations 367*a* and 367*b*. Printing may also be placed on the backing layer 364 of the pre-cut laminate 380 using a printing station 367*c*.

The use of the pre-cut laminate 380 allows for business forms having integrated removable cards or labels 370 to be produced in a multi-step process. For example, a single apparatus may be configured to produce the pre-cut laminate, and then used to produce the business forms by combining the pre-cut laminate 380 with the base layer 360. This allows for a single machine, having a smaller size and requiring fewer die cut, printing, and adhesive stations, to produce the business forms. Alternatively, the pre-cut laminate 380 may be produced on a different apparatus than that used to combine the pre-cut laminate 380 with the base layer 360. For example, the pre-cut laminate 380 may be made off-site and delivered to the location of the apparatus for combination with the base layer 360.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

The invention claimed is:

1. A method of producing a business form having a removable integrated card on a second apparatus using a pre-cut laminate produced on a first apparatus, the method comprising:

providing a backing layer having a first side and an opposing second side;

adhesively securing a second side of a liner layer to at least a portion of the first side of the backing layer using the first apparatus;

forming the pre-cut laminate using the first apparatus by cutting an integrated removable card portion of the backing layer and thereafter supporting the integrated removable card portion of the backing layer with the liner layer;

arranging the pre-cut laminate into a dispensing configuration;

transferring the pre-cut laminate in the dispensing configuration from the first apparatus used for producing the pre-cut laminate to the second apparatus;

providing a base layer having a first side and an opposing second side;

converting the dispensing configuration into a feed configuration;

adhesively securing the second side of the base layer to at least a portion of the first side of the liner layer of the pre-cut laminate in the feed configuration using the second apparatus; and forming a die cut extending substantially through the base and liner layers and at least partially surrounding the integrated removable card portion of the backing layer so that the backing layer maintains the card in the form against unintentional removal from the form.

2. A method of producing a business form in accordance with 1, including the step of positioning a cut-out extending through the base, liner and backing layers adjacent the periphery of the card using the second apparatus, the cut-out facilitating removal of the integrated removable card from the form.

3. A method of producing a business form in accordance with claim 1, wherein the base layer comprises cardstock material and the liner layer comprises a transparent film.

4. A method of producing a business form in accordance with claim 3, wherein indicia is printed on the first and second sides of the base layer.

5. A method of producing a business form in accordance with claim 4, wherein indicia is printed on the first and second sides of the card.

6. A method of producing a business form in accordance with claim 1, wherein the step of arranging the pre-cut laminate into a dispensing configuration includes the step of winding the pre-cut laminate into a roll.

7. A method of producing a business form in accordance with claim 1, wherein the step of arranging the pre-cut laminate into a dispensing configuration includes the step of fan-folding the pre-cut laminate into a stack.

8. A method of producing a business form in accordance with claim 7, wherein the step of converting the dispensing configuration into a feed configuration includes unfolding the stack of pre-cut laminate.

9. A method of producing a business form in accordance with claim 8, wherein a plurality of stacks of pre-cut laminate are provided, and at least a pair of adjacent stacks are connected.

10. A method of producing a business form in accordance with claim 1, wherein the step of cutting an integrated removable card portion of the backing layer and thereafter supporting the integrated removable card portion of the backing layer with the liner layer includes the step of removing the integrated removable card portion.

11. A method of producing a business form having a removable integrated card using a pre-cut laminate, the method comprising:

providing the pre-cut laminate, the pre-cut laminate having a backing layer having a first side and an opposing second side, a second side of a liner layer adhesively secured to at least a portion of the first side of the backing layer, and an integrated removable card portion of the backing layer defined by a die cut extending substantially through the backing layer and supported by the liner layer;

providing a base layer having a first side and an opposing second side;

adhesively securing the second side of the base layer to at least a portion of the first side of the liner layer;

forming a die cut extending substantially through the base and liner layers and at least partially surrounding the integrated removable card portion of the backing layer so that the backing layer maintains the card in the form against unintentional removal from the form; and positioning a cut-out extending through the base, liner and backing layers adjacent the periphery of the card using the a second apparatus, the cut-out facilitating removal of the integrated removable card from the form.

12. A method of producing a business form in accordance with claim 11, wherein the base layer comprises cardstock material and the liner layer comprises a transparent film.

13. A method of producing a business form in accordance with claim 12, wherein indicia is printed on the first and second sides of the base layer.

14. A method of producing a business form in accordance with claim 13, wherein indicia is printed on the first and second sides of the card.

15. A method of producing a business form in accordance with claim 11, wherein the pre-cut laminate is provided in a dispensing configuration consisting of one of a roll and a fan-folded stack.

16. A method of producing a business form in accordance with claim 15, wherein a plurality of stacks of connected pre-cut laminate are provided.

17. A method of producing a business form having a removable integrated card using a pre-cut laminate, the method comprising:

providing the pre-cut laminate, the pre-cut laminate having a backing layer having a first side and an opposing second side, a second side of a liner layer adhesively secured to at least a portion of the first side of the backing layer, and an integrated removable card portion of the backing layer defined by a die cut extending substantially through the backing layer and supported by the liner layer;

providing a base layer having a first side and an opposing second side;

adhesively securing the second side of the base layer to at least a portion of the first side of the liner layer;

forming a die cut extending substantially through the base and liner layers and at least partially surrounding the integrated removable card portion of the backing layer so that the backing layer maintains the card in the form against unintentional removal from the form; and producing the pre-cut laminate on a different apparatus than an apparatus used to produce the business form.

* * * * *